Feb. 7, 1961  J. WINSON  2,970,317
GLOVE AND METHOD OF MANUFACTURE THEREOF
Filed July 22, 1960  10 Sheets-Sheet 4

INVENTOR
JONATHAN WINSON
BY
ATTORNEY

Feb. 7, 1961 J. WINSON 2,970,317
GLOVE AND METHOD OF MANUFACTURE THEREOF
Filed July 22, 1960 10 Sheets-Sheet 5

INVENTOR
JONATHAN WINSON
BY
ATTORNEY

Feb. 7, 1961 J. WINSON 2,970,317
GLOVE AND METHOD OF MANUFACTURE THEREOF
Filed July 22, 1960 10 Sheets-Sheet 6

INVENTOR
JONATHAN WINSON
BY
ATTORNEY

Feb. 7, 1961  J. WINSON  2,970,317
GLOVE AND METHOD OF MANUFACTURE THEREOF
Filed July 22, 1960  10 Sheets-Sheet 9

INVENTOR
JONATHAN WINSON
BY Edward V. Connors
ATTORNEY

Feb. 7, 1961   J. WINSON   2,970,317
GLOVE AND METHOD OF MANUFACTURE THEREOF
Filed July 22, 1960   10 Sheets-Sheet 10

INVENTOR
JONATHAN WINSON
BY
ATTORNEY

United States Patent Office 2,970,317
Patented Feb. 7, 1961

2,970,317

GLOVE AND METHOD OF MANUFACTURE THEREOF

Jonathan Winson, New York, N.Y.

Filed July 22, 1960, Ser. No. 46,865

24 Claims. (Cl. 2—169)

The present invention relates to gloves, and more particularly to gloves made from thermoplastic sheeting and generally, although not necessarily, used with an insulating liner.

This application is a continuation-in-part of my application Serial No. 858,916, filed December 11, 1959, now abandoned.

The usual thermoplastic sheeting may be used as a source material and as the glove is heat sealed, it may be made completely waterproof. However, the teaching in accordance with the invention may likewise be applied to the fabrication of gloves from woven thermoplastic sheeting. Such gloves, while not waterproof, permit some circulation of air through the sides of the glove which removes moisture from perspiration.

A vinyl chloride polymer plasticized sheeting properly formulated for low temperature flexibility is particularly suitable for manufacture of the glove, but other materials may be used. Among suitable materials are vinyl chloride polymer plasticized sheeting, polyethylene sheeting, nylon, or impregnations of these basic materials into fabrics, woven materials of the same materials, also any other material which may be electronically heat sealed to provide the desired seal attaching the materials together. The term "thermoplastic" has been used generically to indicate a suitable sheeting material which readily may be heat sealed using electronic heat sealing apparatus. The availability of thermoplastic sheeting provides an excellent low cost material for inexpensive hand covering.

In particular, sheeting made of vinyl may be produced in practically any color and its surface may be embossed to simulate other materials or embossed with new and unusual designs. Vinyl sheeting, however, is a solid as distinguished from other materials generally used for handwear such as cloth or leather which are inherently porous materials. The vinyl sheeting has resiliency and the solid structure presents a modulus of elasticity such that the flat sheeting when bent tends to spring back into a flat shape. A difficulty in the use of vinyl sheeting is in its fabrication as it does not readily conform to a three dimensional shape as do conventional glove making materials such as soft leather or fabric, and accordingly difficulties are presented in making a glove. Thermoplastic sheeting is preferably fabricated by radio frequency or "electronic" heating using a die electrode, and which is described as the die and press method of electronic heat-sealing.

In the die and press method the entire seal is made at one time using an electrode shaped to correspond with the shape of the desired seal. It is quite obvious that the die and press method is extremely rapid and is thus suitable for mass production.

Gloves made in accordance with the invention are particularly designed for the low price mass market and are particularly suitable for fabrication by production machinery of the die and press type and low cost labor.

A study of the patented art will reveal that prior to my work in the heat sealed field there has been no practical commercial produced glove of this nature sold in the mass market. The first patent showing a hand covering made of thermoplantic sheeting for wear as protection against weather is my Patent No. 2,737,662, issued March 13, 1956, which shows means for attaching a mitten liner to a thermoplastic covering. Probably the only patented art in a glove made from thermoplastic sheeting is Nover Patent No. 2,773,264, issued December 11, 1956, and directed to a two piece construction of thermoplastic sheeting heat sealed along the edges to provide a one-finger and thumb hand covering for use in food handling in connection with the serving of such articles as fried chicken, corn-on-the-cob, and the like in restaurants. My Patent No. 2,782,421, issued February 26, 1957, is directed to a thermoplastic mitten including an improved fingertip construction. On October 15, 1957, my Patents No. 2,809,376 and No. 2,809,377 were issued. Patent No. 2,809,376 is directed to an improved construction in which the entire mitten is made from a single sheet of material. Patent No. 2,809,377 is directed to the method of manufacture of a one piece mitten. Thereafter, on May 9, 1959, my Patent No. 2,884,643 was issued directed to an improvement for elastically shirring the wrist portion of the mitten. On August 25, 1959, Patent No. 2,900,642 was issued to D. A. Bauer for a mitten with a cap member free of attachment from the body of the mitten excepting along the inner edge of the cap member. Insofar as I am aware, there are no other U.S. patents relating to hand coverings made from thermoplastic sheeting.

Although the commercial advantages of heat sealing a glove are apparent, the difficulty of producing a presentable product by electronic heat sealing has prevented its development. The only attempted solution shown in the patented art is the construction disclosed in the Nover patent set out above. However, Nover is only concerned with the edge sealing of a pair of sheets of material, and at best has only produced a "one fingered glove," the bulky seam being positioned between the fingers, and some slack being provided in the rear side of the glove to give fullness.

It should be noted that a glove must be attractive in appearance and must wear well in order to be commercially acceptable. As an example of the mass market in acceptable products of this type, it may be noted that almost three million pairs of mittens have been made under my above listed patents to the present time.

To better understand the problem of fabricating a heat sealed glove which will be attractive, and wear well, and be inexpensive in manufacture, it might be well to briefly review the solutions of the problems in the electronic heat sealing of mittens. The mitten may be considered as formed of two wells, one well enclosing the thumb and another enclosing the four fingers of the hand.

In the mitten the required three dimensional side walls of the wells are obtained by providing extra marginal material on the flat sheeting over that which is required to form the palm and rear sides of the wells. The extra marginal material allows the wells to take on the required three dimensionality to accommodate the thumb and fingers. There is no d.fficulty in obtaining the extra marginal material since only two wells are involved and the thumb well is separated from the finger well at a distance sufficient so that marginal material is available from a flat sheet. This cannot be done in the case of the glove since the four individual fingers are not separated and the marginal material is not available. While marginal material is available from the sheeting to make up the outside side walls of the small finger and index fingers of the glove, there is no material available to make up the inside sidewalls of the small and index fingers to make up the sidewalls of the other fingers.

The present invention aims to provide a construction and a method of construction of a glove which may be electronically heat sealed from thermoplastic sheeting, and which is so fabricated as to provide the required three dimensional sidewalls for the fingers and thumb.

Another object of the invention is to provide a glove which is simple and economical in manufacture, attractive in appearance, and rugged in wear.

In making a glove in accordance with the invention, a fourchette is interposed between two sheets of thermoplastic material, one edge of the fourchette being heat sealed to one of the sheets, the other edge of the fourchette being heat sealed to the other sheet, the heat seal being the sole means of the connection of the fourchette to the sheets. In a further development of the invention, the fourchette is made in the form of a doubled piece of material or a split tube which is heat sealed to the sheets while heat seal prevention means is interposed between the edges of the fourchette to prevent their adherence together while they are being heat sealed to the sheets. In a still further development of the invention, a fourchette assembly is made from sheets of material heat sealed to provide the equivalent of split tubes. This assembly is then interposed between the sheets of material and the stacked assembly heat sealed. In another development of the invention the fourchette is a strip placed on the inner surface of a frame of heat seal prevention material which is also electrically conducting and this assembly interposed between two sheets of thermoplastic material, one edge of the fourchette strip being heat sealed to one of the sheets, the other edge of the fourchette strip being heat sealed to the other sheet, the heat seal being the sole means of connection of the fourchette to the sheets.

Instead of using the strip placed on the frame, in a further development of the invention, a plurality of tubes are slipped over the extensions of the frame defining the fingers thereof, the frame with the tubes in place is then interposed between two sheets of thermoplastic material and sealed as described above. Using tubes alone, the finger tips are left open and a later finger tip seal is made providing a glove with narrow finger tips. In the event a wide finger tip is desired, the tubes may be interconnected with a flat strip which is positioned inside the frame with its edges turned outwardly. In a still further development an improved thumb construction is provided which may be used with all developments of the glove, and which is very economical in construction in that it fits as well as an inset thumb but may be made with a flat seal. This improved thumb may be made with or without a fourchette.

The invention is advantageous in that a glove may be made in a very short time. The actual time from start to finish need not exceed twelve seconds not including the time required to sew and insert the insulating liner. Such a drastic reduction in the time and labor required to produce gloves is tantamount to a revolution in the art.

The invention is further advantageous in that the seams are all electronically sealed and are therefore waterproof. If solid thermoplastic sheeting is used, a waterproof glove is provided.

Other objects and advantages of the invention will be apparent from the following description and from the accompanying drawings which show, by way of example, embodiments of the invention.

In the drawings:

Figure 25 is a cross-sectional view taken along the line 26—26 of Figure 24.

Figure 1:
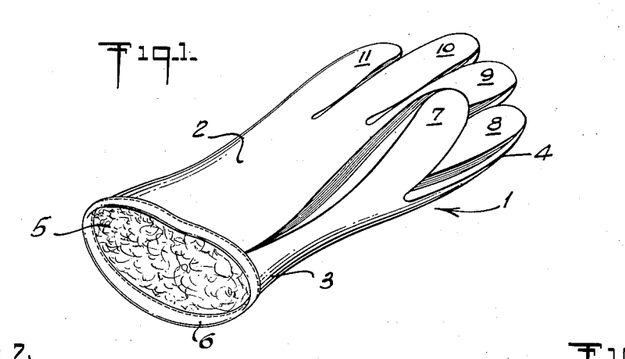
Figure 1 is a perspective view of a glove made in accordance with the invention.
Figure 2:
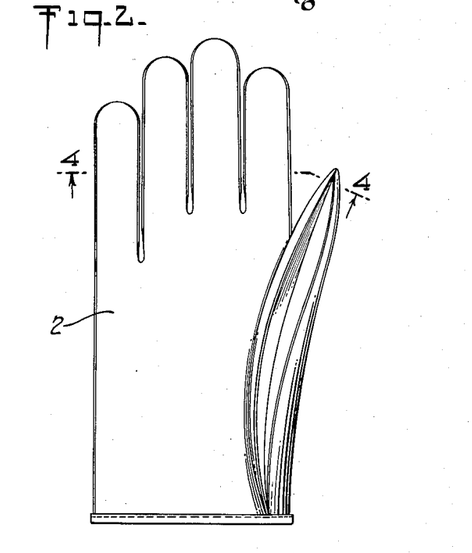
Figure 2 is a plan view of the glove shown in Figure 1.

Referring to the drawings, there is shown in Figure 1 a perspective view of a glove 1, including a palm side 2 and a rear side 3 connected by a fourchette 4. A liner 5 may be used if desired and secured in position by a conventional edging piece 6. Glove 1 includes a thumb 7, an index or first finger 8, a second finger 9, a third finger 10, and a fourth or small finger 11. If desired, elastic shirring means 12 may be applied on the wrist of the glove, preferably across the rear thereof. In addition, decorative embossing 13 may be imprinted on the rear of the glove to simulate the conventional ribbing of leather or cloth gloves.

Figure 4:
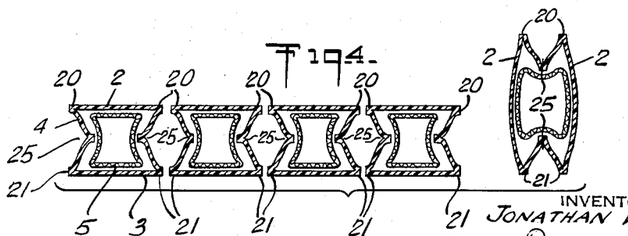
Figure 4 is a cross-sectional view taken along the line of 4—4 of Figure 2.

In Figure 4 there is shown a cross-sectional view of the glove 1. The liner 5 may be made in any conventional manner and is generally of the heat insulating type with a soft inner surface. As may be seen in Figure 4, the palm side 2 and the rear side 3 are made of flat sheets of material as is the fourchette 4 which is sealed to the palm side 2 as indicated at 20 and to the rear side 3 as indicated at 21. In accordance with the preferred embodiment of the invention, the fourchette 4 is provided with a seal 25, the apex of the sealed edges being directed inwardly.

The construction of the fourchette 4 is a very important aspect of the invention and may be accomplished in several ways. The embodiment which is probably the preferable one for mass production is illustrated in Figures 5 through 12. In order to achieve economy of material the fourchette 4 may be made in a plurality of assemblies. A pair of sheets of thermoplastic material 26 and 27 (Figures 5 and 6) are stacked with a sheet of heat seal prevention material 30 interposed therebetween to provide a fourchette assembly 31. The heat seal 25 (Figure 5) is made with a shaped electrode. The remaining edges 28 are left unsealed for ease in the later removal of the heat seal insulating member 30. For simplicity of illustration in Figure 5, the fourchette assembly is shown only for the left hand glove. In actual construction the fourchette assembly for the right hand glove is preferably made of a similar construction to the right of the center line.

The heat seal prevention material 30 may be made of various types of paper, Bakelite, various metals such as brass, aluminum or steel. The heat seal preventive effect may be achieved by coating the inside surfaces of the thermoplastic sheeting with a heat seal prevention chemical such as polystyrene. In the event a solid material, such as paper, is used for the heat seal prevention material 30, it is precut to the desired outline as may be seen in Figure 5, and provided with positioning holes which align with positioning holes 43 in sheets 26 and 27.

Figure 5:
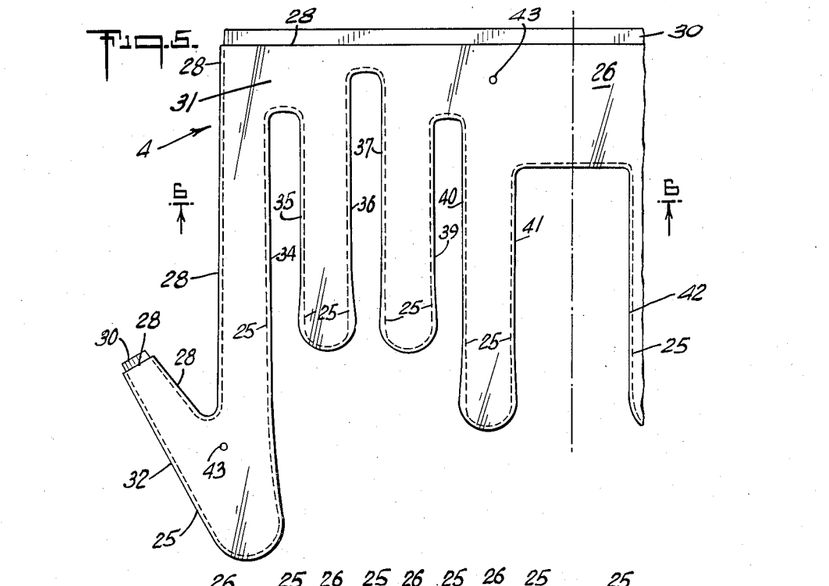
Figure 5 shows a sealed fourchette assembly for the inside of the thumb and for the sidewalls of the fingers of the left hand excepting the outside fourchette of the little finger. The assembly for the right hand is shown broken away.
Figure 6:
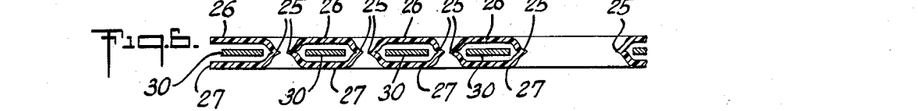
Figure 6 is a cross-sectional view taken along the line 6—6 of Figure 5.

The fourchette assembly of Figure 5 is designated as 31 and includes the fourchette for the inside 32 of the thumb, both edges 34 and 35 of the index finger 8, edges 36 and 37 of the second finger 9, edges 39 and 40 of the third finger 10, and the inside edge 41 of the fourth or small finger 11. Also, on the fourchette assembly 31 is shown an edge 42 for the inside of the fourth or small finger for the right hand. In order to position the fourchette assembly 31 in place as shown in Figure 11, the assembly is provided with two or more alignment holes 43.

Figures 7, 8, 9, 10:
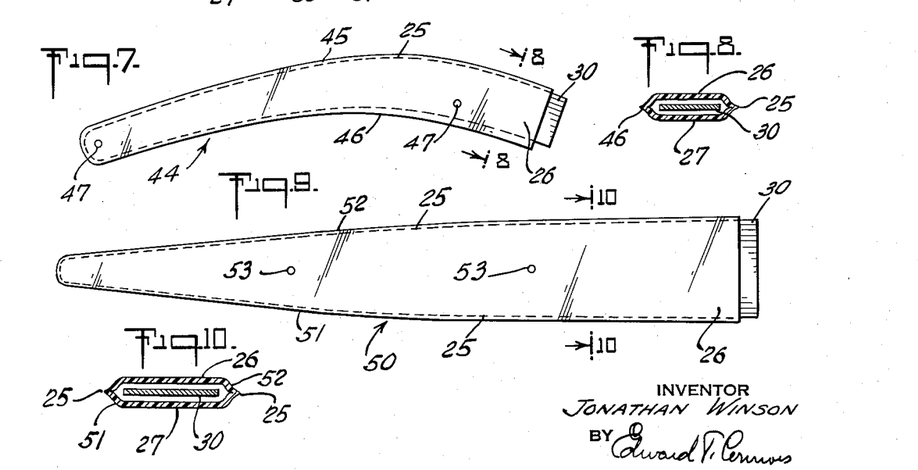
Figure 7 is a sealed fourchette assembly for the outside of the thumb. This assembly is shown in position in Figure 11.
Figure 8 is a cross-sectional view taken along the line of 8—8 of Figure 7.
Figure 9 is a sealed fourchette assembly for the outer edges of the little fingers of the gloves for both hands. This assembly is shown in position in Figure 11.
Figure 10 is a cross-sectional view taken along the line 10—10 of Figure 9.
Figure 11:
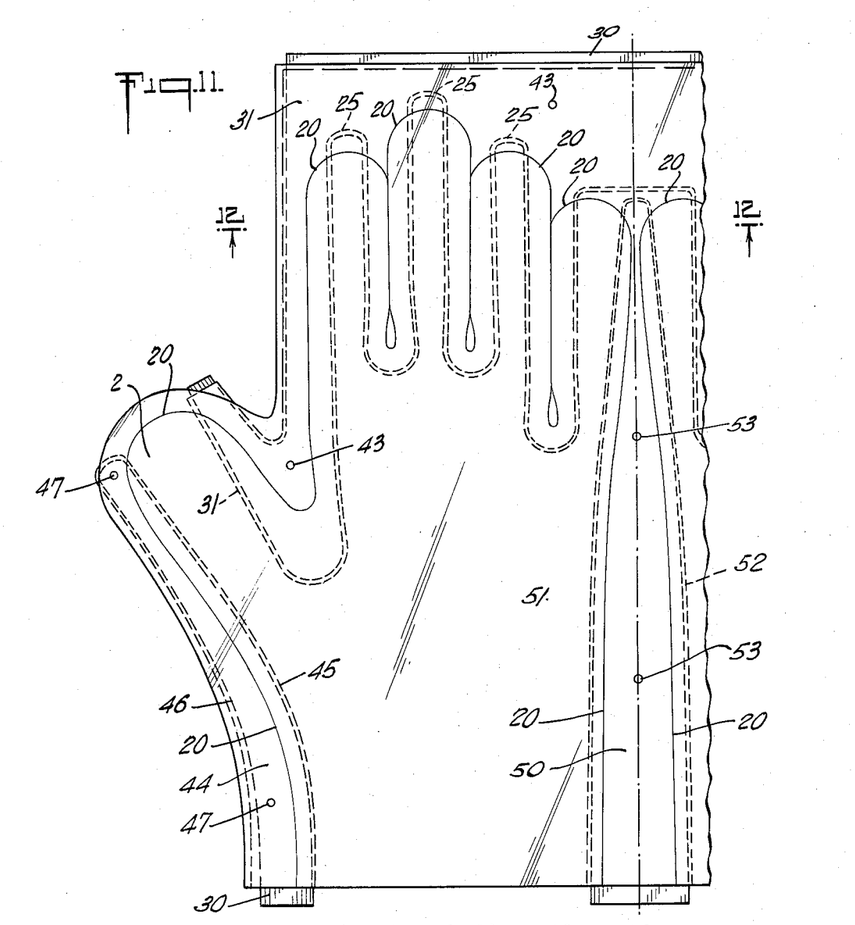
Figure 11 is a sealed glove assembly before the surplus material has been torn away and before the heat seal prevention material has been removed. The right hand section is shown broken away for simplicity of illustration although the right hand glove is usually made simultaneously.
Figure 12:
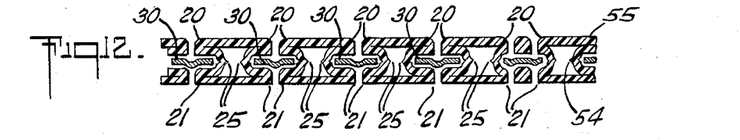
Figure 12 is a cross-sectional view taken along the line 12—12 of Figure 11.

In Figure 7 there is shown a fourchette assembly 44 shown in assembled position in Figure 11. The fourchette assembly 44 is also made from the sheets 26 and 27 stacked with a sheet of heat-sealed prevention material 30 interposed therebetween. The fourchette assembly 44 provides outside edge 45 of the thumb 7. Concave edge 46 of the assembly 44 is sealed to retain the heat sealed prevention material 30 in place during assembly operations. Positioning holes 47 are provided to engage over pins in the conventional manner to hold the parts in position during the assembly operation. It should be noted that in a later operation the sealed edge 46 will be discarded as surplus.

In Figures 9 and 10 there is shown a fourchette assembly 50 also made of the sheets 26 and 27 stacked with heat-sealed prevention material 30 interposed therebetween. Edge 51 of fourchette assembly 50 is to provide the outer fourchette for the fourth or small finger 11 of the left hand. Edge 52 is to provide the outer fourchette for the small or fourth finger 11 of the right hand. Positioning holes 53 are provided to engage over pins in the conventional manner to hold the parts in position during the assembly operations.

The fourchettes 31, 44 and 50 are made by placing sheet 27 on a tray with pegs which align with the positioning holes therein. Over sheet 27 is heat seal prevention material which is aligned by its positioning holes on the pegs. On top of this is placed the sheet 26 in the same manner. The assembly is then heat sealed with a shaped electrode which provides the seals 32, 34, 35, 36, 37, 39, 40, 41, and 42 (Figure 5), and the seals 45 and 46 (Figure 7), and the seals 51 and 52 (Figure 9). The assemblies 31, 44 and 50 are independent units but are sealed simultaneously and placed close together while being sealed for economy of material. All of these seals are provided with a tear seal edge so that the surplus material may be stripped away and the assemblies separated from each other.

After the fourchette assemblies, 31, 44 and 50 have been completed, they are assembled in position over pegs on a tray over a palm sheet 54 (Figure 12) of thermoplastic material which will form the palm side 2 of the glove.

Figure 3:
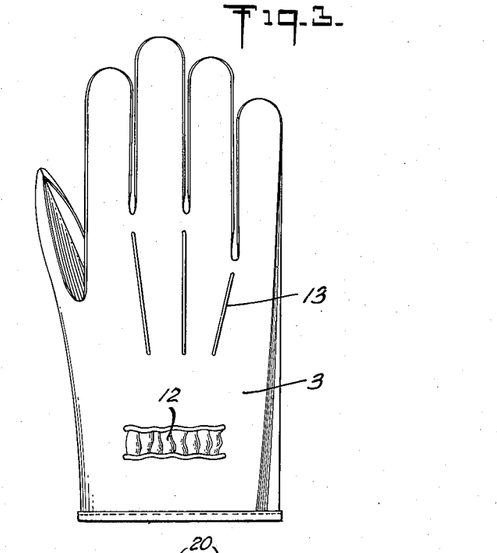
Figure 3 is a back view of the glove shown in Figure 1.

A rear sheet 55 (Figure 12) is placed over the fourchette assemblies 31, 44 and 50, and the entire stacked assembly positioned under the electrode of an electronic sealing apparatus, the tray forming the bottom electrode. The top electrode of the electronic sealing apparatus is shaped to make the seals 20 and 21 (Figure 12) and to provide a tear edge. While the rear sheet 55 may be flat, a better fit is given to the finished glove if the rear side of the glove is elastically shirred as indicated at 12 (Figure 3) before being assembled into position. In this case the positioning holes in sheet 55 are so placed that the sheet can be assembled in shirred condition. A further description of the shirring of the palm and rear sheets will appear hereafter. The sealing of the assembly is done in one operation. The electrode simultaneously seals the palm side to the rear side along the periphery of the glove at the locations where the fourchette is absent, it seals the palm adjacent edges of the fourchette to the palm side and the rear adjacent edges of the fourchette to the rear side at the locations where the fourchette is present; further, the electrode may be made to cut through or provide a tear seal between the fingers of the glove and around the periphery of the entire glove so that surplus material may be removed and the fingers separated. Of course, the tear seal may be omitted if desired and the surplus material later cut away from the glove.

Although a single shaped electrode and a flat tray electrode may be used to provide these seals, a somewhat neater tear seal, particularly between the fingers, is made by providing the tray with a low but shaped contour matching the shape of the upper shaped electrode.

The purpose of the heat seal prevention material 30 is to prevent the seals 20 and 21 from fusing together as both of these seals are made at the same time. The heat seal prevention material 30 remains intact during the sealing operation and is pulled out either before or at the same time as the surplus material is stripped away.

A heat sealed assembly is shown in Figure 11 in which all of the seals have been completed but the heat seal prevention material 30 has not been removed and the surplus material around the periphery of the glove has not been torn away. The final basic glove is fabricated from the palm sheet, the fourchette assemblies and a rear sheet. The finished seals 20 and 21 have been made and are of the tear type so that the surplus material is either cut away or merely attached by a very thin amount of material. In the cross-sectional view of Figure 12, the tear seals are shown as made completely through the material for simplicity of illustration. The edges of the fourchette and the palm and rear sides are in one-sided lap joint relationship and the cut edges are directed outwardly, the heat seal being the sole means of the connection of the fourchette to the palm and rear sides. The seal 25 of the fourchette is positioned so that the apex of the sealed edges is turned inwardly and the fourchette as viewed in the finished glove presents a creased appearance.

Figure 13:
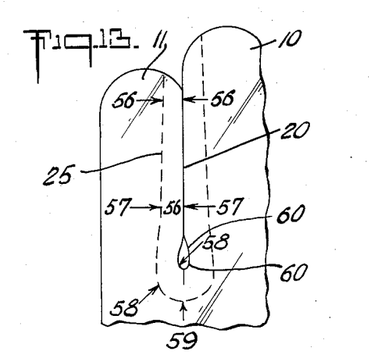
Figure 13 is an enlarged fragmentary view illustrating two adjoining fingers, the position of the flattened fourchette being shown in dashed line.

It should be noted that the distance from the fourchette seal 26 (Figure 13) to the edge seal 20 determines the amount of fourchette height at that point. Thus in Figure 13 the distances 56—56, 57—57, 58—58, and 59 become progressively larger providing for the increased height of the hand perpendicular to the palm from the fingertip to the crotch. In addition, stress concentration is avoided at the finger crotches by making the outer seal with a radius at the crotch portion as indicated at 60. If a construction were to be made without the radius 60 the heat seal 20 between fingers 10 and 11 would be a straight line seal. As is well known, the end of a straight seal creates an area of stress concentration probably resulting in tears during use of the gloves. By providing the radius 60 for the seal 20 at the crotch, a greatly improved construction results.

Figure 14:
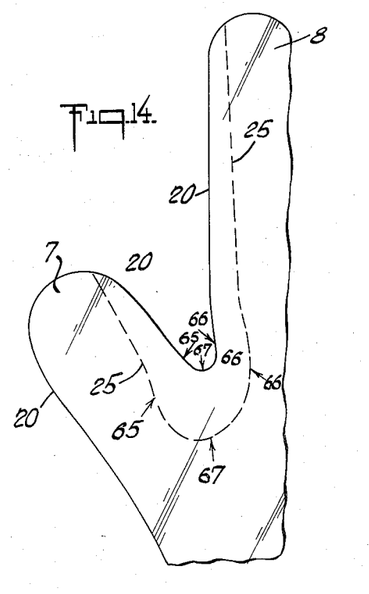
Figure 14 is an enlarged fragmentary view showing the thumb and the first or index finger, the position of the flattened fourchette being shown in dashed line.

As may be seen in Figure 14, a similar construction is used at the crotch of the thumb 7 and the index finger 8. The seal 25 of the fourchette is made with its distance from the seal 20 progressively widened as indicated between points 65—65 and 66—66, and still further widened as indicated between points 67—67.

Figure 15:
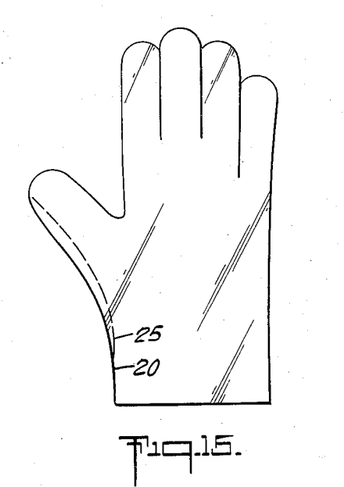
Figure 15 is a reduced plan view of the glove. The dashed line showing a re-entrant construction for the fourchette.

Figure 15 shows a plan view of a glove having a re-entrant fourchette. The lower end of the seal 25 of the fourchette is merged into the seal 20 and 21 before reaching the wrist end of the glove providing a re-entrant or disappearing fourchette construction. This construction might also be used on the small finger edge of the glove or on both edges if so desired.

Figure 16:
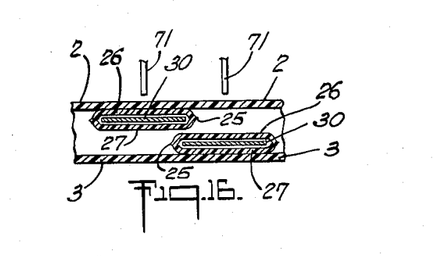
Figure 16 is a cross-sectional view of a fourchette assembly modified somewhat so as to provide an increased height to the fourchette.
Figure 17:
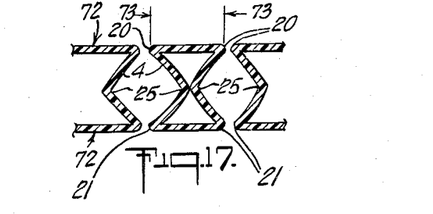
Figure 17 is a cross-sectional view showing the construction as made in Figure 16 and thereafter separated, thus illustrating the construction wherein the fourchette may have a height greater than the width of the fingers.

With the construction of Figure 5 the height of the fourchette is limited by the available width of the fingers. In order to provide a fourchette of increased height, the construction in Figure 16 may be used. In this modification, it should be noted that the seals 25 of the fourchette assembly are overlapping, thereby providing a heightened fourchette which may be practically double the height of the fourchettes previously described. In Figure 16, top electrodes 71 are shown in position. The completed seal is shown in Figure 17 in which the same numerals are used to indicate the parts as in the previous figures. It should be noted that the total height of the fourchette between the points 72—72 may be greater than the width of either side of the finger as indicated at 73—73.

Figure 18:
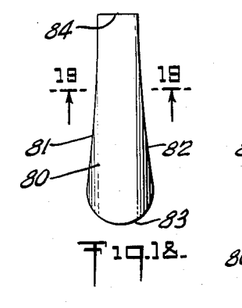
Figure 18 shows the plan view of a fourchette tube assembly made of two sheets of thermoplastic material heat sealed together.
Figure 19:
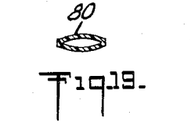
Figure 19 is a cross-sectional view taken along the line 19—19 of Figure 18.
Figures 20, 23:
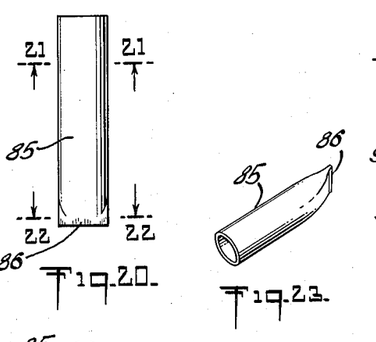
Figure 20 shows a plastic tube with a sealed end which may be used as a fourchette assembly.
Figure 23 is a perspective view of the construction shown in Figures 20–22.
Figures 21, 22:
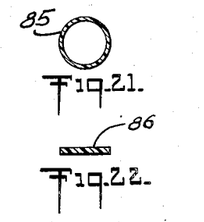
Figure 21 is a cross-sectional view taken along the line 21—21 of Figure 20.
Figure 22 is a cross-sectional view taken along the line 22—22 of Figure 21.

In accordance with the modification of the invention, a fourchette assembly may be made up individually for the space between any two fingers. In Figure 18 there is shown a closed end tube 80 which may be made of two flat pieces of thermoplastic sheeting heat sealed along its sides 81, 82, and around its end 83, its upper end 84 being left open, to receive a strip of heat seal prevention material. Another construction is shown in Figure 20 in which a conventional tube 85 made of thermoplastic material is heat sealed across its end as indicated at 86. The tube 85 is shown in perspective view in Figure 23. In utilizing this construction, the sealed edge 86 may be placed in the stacked assembly either parallel to the plane of the front and rear sides, or perpendicular to this plane. In a stacked assembly between the palm and rear side sheets, the tube with its sealed edge perpendicular to the plane of these two sheets becomes temporarily flattened, allowing a seal to be made as previously described. It should be noted that the electrode making the seal is spaced the distance 59 (Figure 13) from the sealed edge 86 (Figure 23).

Figure 24:
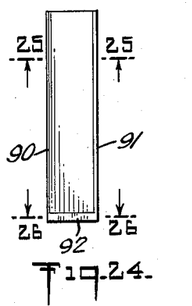
Figure 24 is a plan view showing a doubled plastic tube sheet heat sealed along its longitudinal edge and across its end.
Figure 25:
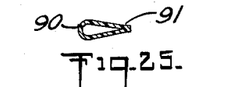
Figure 25 is a sectional view taken along the line 25—25 of Figure 24.
Figure 26:
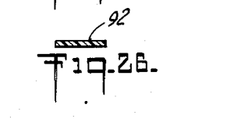
Figure 27:
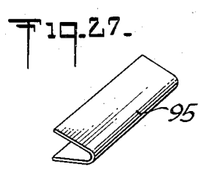
Figure 27 is a perspective view of a piece of doubled thermoplastic sheeting which may be used as a fourchette.
Figure 28:
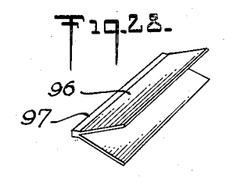
Figure 28 is a perspective view of a modified construction in which a fourchette is made of two pieces of thermoplastic sheeting heat sealed along one edge.
Figure 29:
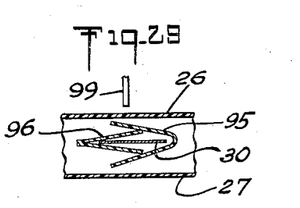
Figure 29 is a cross-sectional view showing the fourchette assemblies of Figures 27 and 28 in position between a palm and rear side about to be sealed.

Another example of fourchette assembly 90 is shown in Figure 24. A single piece of thermoplastic sheeting is doubled over and a heat seal made along its longitudinal edge as indicated at 91, and one of the ends is laterally sealed as indicated at 92, the other end being left open to receive the heat seal prevention material, or, of course, the heat seal prevention material may be placed in position before the seals are made. A still further form of fourchette assembly 95 is shown in Figure 27 in which a doubled piece of sheeting of generally U-shaped cross section is used, none of the edges being sealed. A still further form of fourchette assembly 96 is shown in Figure 28 which is made of two sheets of thermoplastic material heat sealed along their edges as indicated at 97. In Figure 29 the fourchette assembly 95 is shown stacked with the fourchette assembly 96, a heat seal prevention member 30 being interposed therebetween and the two assemblies positioned between a palm side sheet 26 and a rear side sheet 27, an electrode member 99 being shown in position to make the seal.

Figure 30:
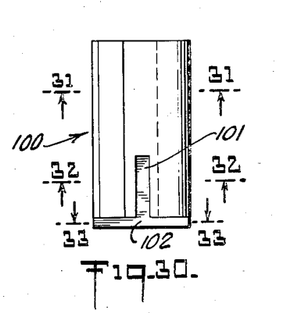
Figure 30 is a plan view of the fourchette assembly in Figure 29 with its lower end sealed before placing in the assembly of Figure 29.
Figure 31:
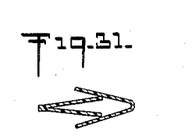
Figure 31 is a cross-sectional view taken along the line 31—31 of Figure 30.
Figure 32:
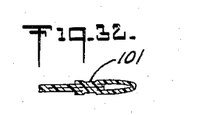
Figure 32 is a cross-sectional view taken along the line 32—32 of Figure 30.
Figure 33:
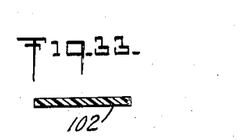
Figure 33 is a cross-sectional view taken along the line 33—33 of Figure 30.
Figure 34:
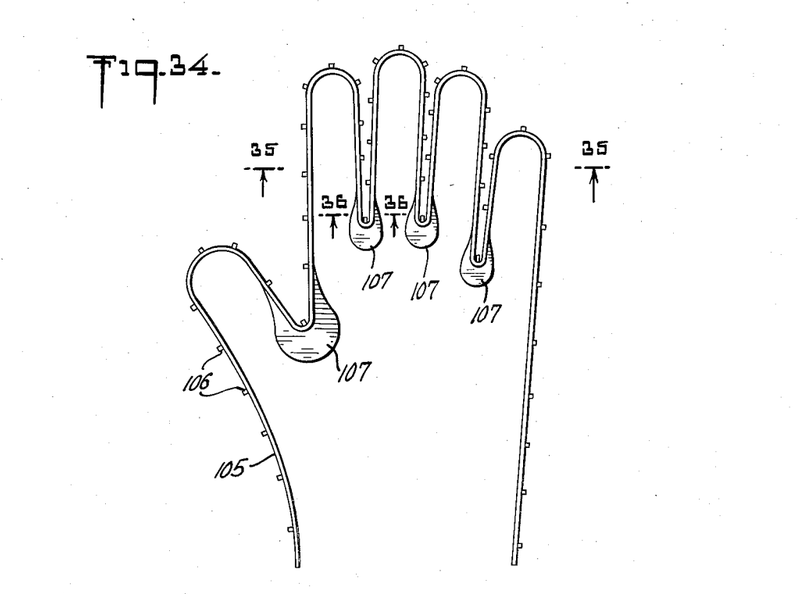
Figure 34 is a plan view of a frame electrode.
Figure 35:
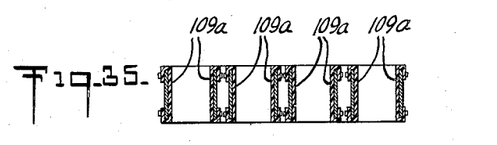
Figure 35 is a cross-sectional view taken along the line 35—35 of Figure 34 but with a fourchette strip in position on the frame electrode.

In Figure 30 a fourchette assembly 100 is a composite of the assemblies 95 and 96, the bottom of the assembly sealed in the longitudinal direction as indicated at 101 and in the lateral direction as indicated at 102. The seal 101, as may be seen in Figure 32, is made with heat seal prevention material present in order to prevent the adherence of the palm side to the rear side. Seal 102 may be made either before or after the glove is sealed along its periphery although it is preferable that the seal 102 be made before the fourchette assembly 100 is incorporated into the glove.

In making a glove utilizing any of the fourchette assemblies 81 to 100 inclusive, the assembly is placed between sheets of material and secured in position in any suitable manner. The final seal is made as heretofore explained.

In the foregoing description the peripheral seals 20 and 21 have been shown as intercepting the fourchette assembly below the tips of the fingers or thumbs. I prefer such a construction although alternatively the parts may be so dimensioned that the edge seals 20 and 21 are outwardly of the fourchette seal 25 at the tips of the fingers and thumbs, thereby providing a fourchette at the tips of the fingers or thumbs. Using such construction, a continuous fourchette may be provided around the sealed periphery of the glove. The terms "seal," "heat seal," "weld," or "welded joints" have been used to define the homogeneous connection in which the parts have been joined together by the use of high frequency electronic excitation using a shaped electrode.

Figures 36, 37, 38:
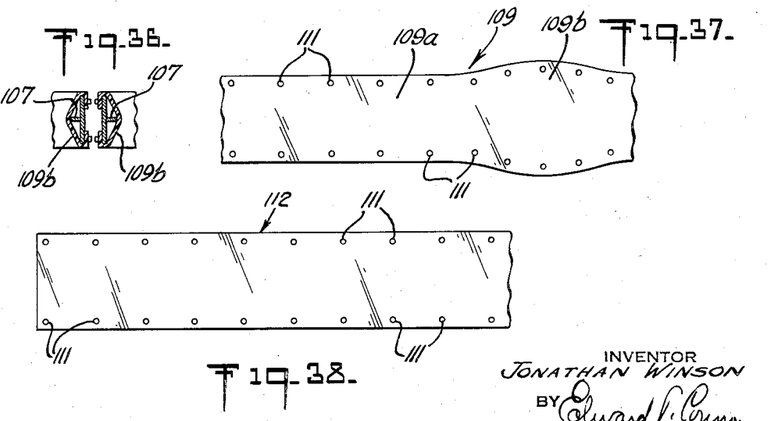
Figure 36 is a cross-sectional view taken along the line 36—36 of Figure 34 but with a fourchette strip in position on the frame electrode.
Figure 37 is a plan view of a fourchette strip for mounting on the frame of Figure 34. The left hand side of the strip corresponds to the portion shown in section in Figure 35, and the right hand portion of the strip corresponds to the portion shown in section in Figure 36.
Figure 38 shows a plan view of a fourchette strip of uniform width along its entire length.

In the embodiments previously described, the construction is such that a sheetlike heat prevention material is used. A modification may be made wherein the heat prevention material is made in the form of a frame electrode made of electrical conducting material over which may be placed the fourchette and the covered frame interposed between sheets of material which will form the palm and rear sides of the completed glove. The stacked assembly is then sealed between a pair of flat electrodes. In Figures 34–38 there is shown a construction wherein a frame 105 is made in the desired outline of the completed glove. A plurality of pins 106 are positioned along the outer surface of the frame 105. Also on the frame 105 at the crotches of the fingers and between the index fingers and the thumb are positioned templets 107. In Figure 37 there is shown a fourchette strip 109 having a narrow portion 109a on its left side and a widened portion 109b on its right side, the edges of the fourchette strip being perforated as indicated at 111. The fourchette strip 109 is wound on the inside of the frame 105, the edges of the strip being turned outwardly over the edges of the frame so that the perforations 111 are engaged over the pins 106. The strip 109 is shown in position in the cross-sectional view Figure 35, the narrow portion 109a being visible. In Figure 36 the wide portion 109b is visible.

The fourchette height in this embodiment at any point in the glove is determined by the width of the fourchette strip at that point; thus the widened portion 109b of strip 109 in conjunction with the templets 107 provide increased height at the crotches while at the same time permitting the use of a flat seal. If a glove of uniform height is desired, a strip 112 of uniform width, as shown in Figure 38, may be used. In this case the templets 107 are omitted from the frame 105.

In making a glove using the frame electrode 105 as a heat seal prevention means, the frame is wound with the fourchette strip 109 and interposed between palm and rear sheets as heretofore described, the stacked assembly being placed between flat electrodes and sealed. A tear seal edge may be provided, if desired, and the surplus material easily may be stripped away, or a bar seal may be made and the surplus material later cut away. In an electronic seal of this type, as is well known in the art, as the seal is made while the fourchette strip 109 is in stressed condition at the point where it is turned over the edge of the frame 105, the edge will during the sealing operation and will be molded into the configuration of the edge of the frame so that the fourchette will be directed away from the palm and rear sheets at the seal at an angle of approximately right angles as distinguished from the flat lay of sheets lying parallel when sealed. In an alternative method, the palm and rear sides may be precut to their desired periphery before sealing. As the frame 105 is on the outside of the completed glove, there is no difficulty in separating it from the completed glove.

It is obvious that any other means may be employed to hold the fourchette 109 or 112 in position. For example, the frame 105 may be fitted with needle pins, in which case the perforations 111 are not required. Other constructions may use vacuum or adhesive holding means well known in the art.

In any of the foregoing constructions, in the event the palm and rear sides are made of unaltered sheets of material, the gloves will be neither right nor left handed although if made with ample proportions they may be worn on either hand. However, in order to provide a better fit, it is desirable that the rear side have a greater area than the palm side. This may be accomplished in several ways such as by removing a generally triangularly shaped section from the palm side adjacent the wrist portion and thereafter sealing the cut edges together, or by slitting the rear side and inserting a gusset. I prefer, however, to make the rear side somewhat fuller than the palm side by providing shirring on the rear side and sealing the rear side to the palm side while the rear side is in unstretched condition. The elastic shirring may be applied by known methods or as taught by my previously mentioned Patent No. 2,884,643. Alternatively, the sheet forming the palm side of the glove may be elastically shirred, the palm side being sealed to the rear side while the palm side is in stretched condition. Any combination of the above methods may be used and will provide right and left handedness to the glove.

From a low cost production standpoint, I prefer to make the gloves in pairs at one time. Alternatively, one glove might be made at one time using separate sheets of material for the palm and rear sides. Still further, a construction may be used in which a single piece of material may be doubled over the fourchette assembly to form the palm and rear sides of the finished glove. Further, while the glove has been described as being made with the thumb integral with the palm and rear sides, an alternative construction may be used in which the thumb may be made as shown in my above-mentioned Patent No. 2,782,421.

While I prefer to seal the glove right side out, an alternative construction might be made in which the entire glove is sealed and later reversed providing a reversed seam construction. Further, the fourchette assemblies of Figures 5, 7, 10, 18, 24, 27, 28 and 30 might be reversed before placing in the assembly for final sealing. With such reversed construction the apex of the fourchette seals would be directed outwardly in the finished glove, presenting a cusped appearance. Still further, the last mentioned fabrication, after being finally sealed, might be reversed.

Throughout the specification, several modifications of the fourchette assemblies have been described. It should be noted that in all cases the fourchette of the finished glove presents the general appearance of a channel section of generally U or V cross-sectional shape. In some cases two adjacent fourchettes are made by splitting a generally tubular thermoplastic member by the final seal. Also, fourchettes on the edge of the glove present the general appearance of a channel section of generally U or V cross-sectional shape and may be made of a tubular member which is split and half of the tube discarded. It is to be understood that the term "tube" as used herein is to be broadly construed as defining any configuration of material presenting a generally circular, elliptical, or similar cross sectional shape and being an elongated hollow body, also including such cross-sectional shaped configurations as may be made by overlapping or matching the ends of doubled material. A "split tube" is to be understood as defining a longitudinally extending section of a tube as defined above. Thus, among other constructions, a doubled piece of material as shown in Figure 27 is a split tube presenting the general appearance of a channel section of generally U or V cross sectional shape. Even in the modification, wherein the fourchette strip is placed on the heat seal preventative frame, it should be noted that the fourchette presents the general appearance of a channel section of U- or V-shaped cross-sectional shape. Actually, a tube might be slipped over the frame of Figure 34 instead of using the fourchette strip and the resulting fourchette would result from the splitting of this tube by the tear edge of the frame.

Figure 39:
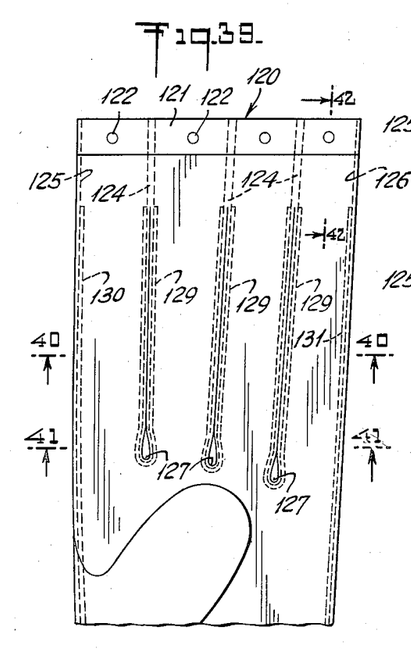
Figure 39 is a plan view of a frame electrode with a sealed glove in position thereon, the fourchettes of the gloves made from tubes slipped over linear extensions of the frame.
Figure 40:
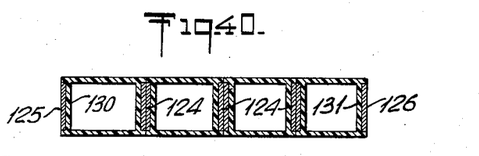
Figure 40 is a sectional view taken in the direction of the arrows 40—40 of Figure 39.
Figure 41:
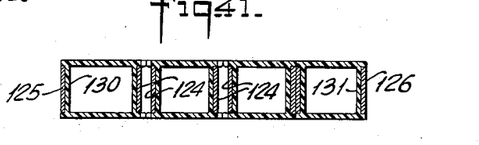
Figure 41 is a sectional view taken in the direction of the arrows 41—41 of Figure 39.
Figure 42:
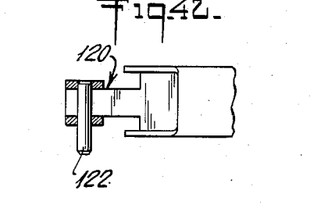
Fig. 42 is a sectional view taken in the direction of the arrows 42—42 of Fig. 39.

A closely related and modified glove construction is shown in Figure 39. A frame 120 includes a cross member 121 having a plurality of positioning pins 122 extending therethrough, a plurality of linear extensions 124 for making the seals between the fingers, and frame members 125 and 126, respectively, for the outer edges of the forefinger and little finger. As may be noted in Figure 39 the linear extensions 124 are formed with widened ends providing curved portions 127, which will form a corresponding shape to the electronic seal at this point, thereby providing a construction more stress-resistant and thus minimizing the possibility of a tear extending into the hand portion of the glove from the crotches. A glove may be made on the frame 120 by inserting any of the tubular members described herein over the linear extensions 124 as indicated at 129. Likewise, longer tubular members may be slipped over the frame members 125 and 126, the inner portions of these longer tubes remaining after the main seal is completed and the excess removed are indicated at 130 and 131.

Figure 43:
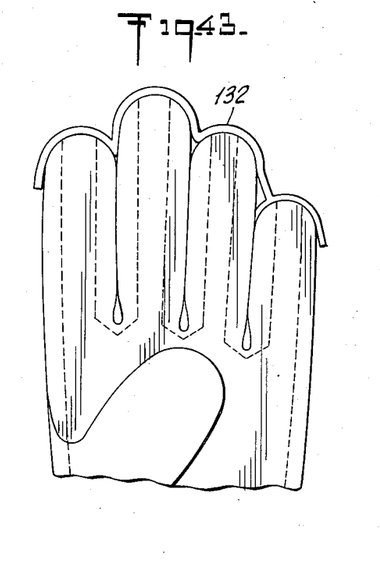
Figure 43 is a plan view of a die electrode for sealing the tips of the fingers of a glove, the die being shown in sealing position.

In making the glove the tubular members 129, 130 and 131 are slipped in position over the frame member 120. The frame with these members in place is then interposed between sheets of thermoplastic material which will form the palm and rear sides of the finished glove. The assembly is then placed between flat electrodes and a high frequency current passed between the electrodes as described previously. Preferably a tear edge is formed by the seals around the periphery of the glove and between the fingers thereof. So far described the glove will have open tipped fingers. In order to close the tips of the fingers a narrow closed tip may be made by sealing the ends of the fingers with a die electrode 132 as shown in Figure 43.

Figure 44:
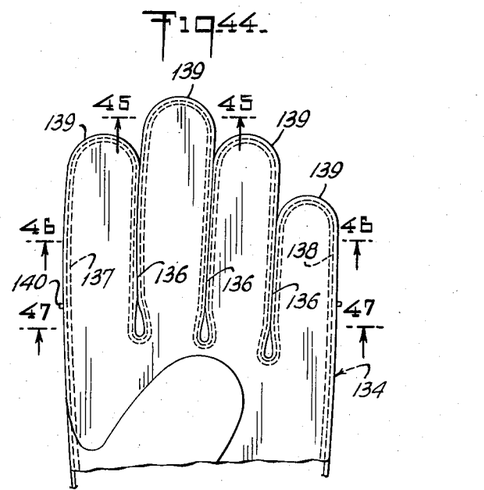
Figure 44 is a plan view of a frame electrode with a sealed glove in position thereon, the fourchettes of the glove made from a strip as shown in Figure 48-52 and placed on the inner surface of the frame with the edges of the strip turned outwardly over the frame at the fingertips and at the outer edges of the forefinger and little finger.
Figure 45:
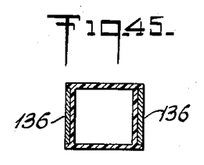
Figure 45 is a sectional view taken in the direction of the arrows 45—45 of Figure 44.
Figure 46:
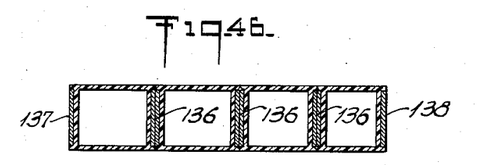
Figure 46 is a sectional view taken in the direction of the arrows 46—46 of Figure 44.
Figures 47, 48, 49, 50, 51, 52, 53, 54, 55, 56, 57, 58:
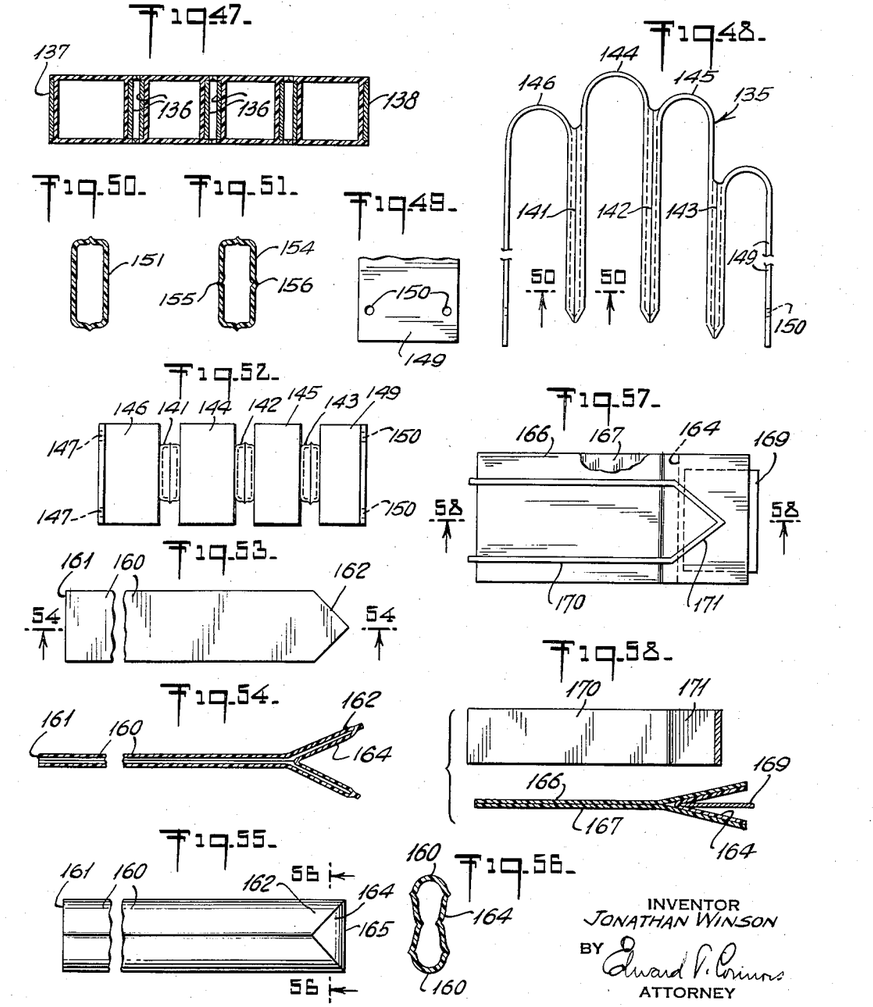
Figure 47 is a sectional view taken in the direction of the arrows 47—47 of Figure 44.
Figure 48 is an assembly of tubes with connecting pieces for a modified form of fourchette for the frame shown in Figure 44.
Figure 49 is a fragmentary view as seen from the right of Figure 48.
Figure 50 is a sectional view taken in the direction of the arrows 50—50 of Figure 48.
Figure 51 is a view corresponding to Figure 50 and showing a modification of the tube in which the fourchettes have a creased appearance.
Figure 52 is an end view of the assembly shown in Figure 48.
Figure 53 is a plan view of a modified tube construction in which an end fourchette is provided for the tube.
Figure 54 is a sectional view taken in the direction of the arrows 54—54 of Figure 53.
Figure 55 is a side view of the tube construction shown in Figure 53 but with the tube fully expanded as if spread over one of the linear extensions of Figure 39.
Figure 56 is a cross sectional view taken in the direction of the arrows 56—56 of Figure 55.
Figure 57 is a plan view of the tube construction of Figure 53 showing the construction thereof with the heat sealing electrode and slip sheets in position.
Figure 58 is a sectional view taken in the direction of the arrows 58—58 of Figure 57.

In Figure 44 there is shown a frame 134 having in position therein on its inner surface a glove which has been sealed but not yet removed from the frame but the excess material has been removed. In using the frame 134 an assembly 135 as shown in Figure 48 is placed in position on the frame. The frame 134 is similar to the frame 120 in that frame 134 also has linear extensions 136 (similar to the linear extensions 124 of Figure 39) defining the space between the fingers, and has frames 137 and 138 (similar to the frames 125 and 126 of Figure 39) respectively defining the outer surfaces of the fore and little fingers. However, frame 134 has fingertip portions 139 to form the tips of the fingers of the gloves at the same time as the fingers are sealed to the palm and rear side sheets. The frame 134 has a plurality of pins 140 extending from the frame approximately in the center and on the outer surface thereof, or alternatively, two rows of pins 140 may be placed on the outer surface of the frame adjacent the edges thereof. It may be noted that the frame 134 (Figure 44) is similar to the frame 105 (Figure 34) excepting that in frame 105 some space is provided between two adjacent sides of the fingers. The frame 105 being adapted to receive the strip 109, while the frame 134 does not require as much space between the fingers since it is adapted to receive tubes slipped over the linear extensions 136.

The assembly 135 includes tubular portions 141, 142 and 143. The tubular portion 141 is connected to tubular portion 142 by a piece of flat sheeting 144 and the tubular member 142 is connected to the tubular member 143 by another piece of flat sheeting 145. The outer edge of the tubular member 141 has a flat strip 146 extending therefrom and apertured at a plurality of spaced locations along its edge as indicated at 147. The tubular member 143 has a flat strip extending therefrom as indicated at 149 and apertured as indicated at 150. The tubular members 141—143 may be of any construction described herein.

Figure 50 shows a cross sectional view of a tubular member 151 in which seams 152 are made on opposite sides thereof. Such a tubular member will provide a plain fourchette. In Figure 51 there is a sectional view of another tubular member 154 having its seals 155 and 156 made on the sides thereof so that when used in the glove construction the finished fourchette will present a creased appearance.

In Figures 53–58 there is shown a tube construction in which the tube may be made of two pieces of heat sealed material, the closed end of the tube being fourchetted, so that when the tube is expanded the closed end will be of increased width. A tube of this construction has unique advantages when used as a fourchette. It presents a creased appearance, additionally, the closed end of the tube forms a cross surface which fits in a natural manner in the crotch, finally it is capable of being made by a single flat heat seal.

In Figure 53 there is shown a tubular member 160 having an open end 161 and a closed end 162 of generally triangular shape. As may be seen in Figure 54 the end 162 includes a fourchette 164.

In Figure 55 there is shown a side view of the construction shown in Figures 53 and 54 but with the tube turned ninety degrees and flattened. It should be noted that when the tube 160 is turned ninety degrees and flattened and its fourchette 164 thereby expanded, the closed end portion of the tube 160 will present a surface 165. The tube 160 may be made as shown in Figures 57 and 58 from two pieces of sheeting 166 and 167 having a doubled fourchette member 164 positioned in one end with a slip sheet 169 inserted between the opened edges of the fourchette member. The assembly may be sealed by a frame electrode 170 having an end 171 of generally triangular shape. An equivalent construction to that shown in Figure 55 may be made by forming an open-ended tube from two pieces of sheeting sealed along their longitudinally extending edges and thereafter turning the tube ninety degrees and flattening it, then cross sealing an open end of the tube. However this construction requires two operations in which the tube must be handled individually, while in the construction of Figure 55 a plurality of tubes may be made at one time.

Figure 59:
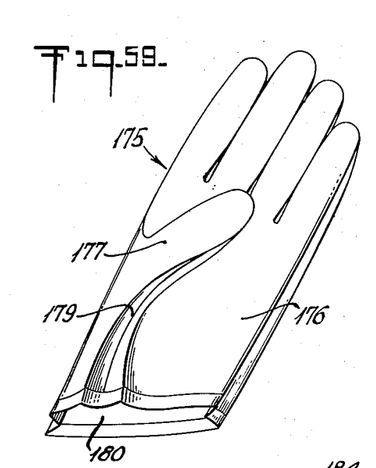
Figure 59 is a perspective view of a glove showing a modified thumb construction.

In Figure 59 there is shown a glove 175 having a modified thumb construction in which a flat sheeting forming the palm side 176 has heat sealed thereto another piece of flat sheeting 177 forming the outside of the thumb. A fourchette 179 connects the two sheets. After the assembly 176 and 177 has been made it is heat sealed to a rear sheet 180 according to any of the methods herein described.

Figure 60:
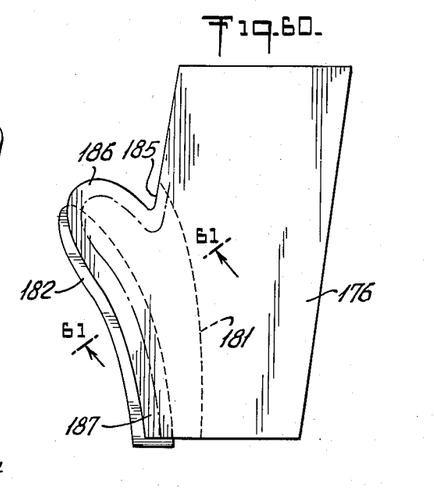
Figure 60 is a plan view of an assembly ready for sealing to form the thumb, the sealed assembly providing the palm side of the glove shown in Figure 59.
Figures 61, 62, 63, 64:
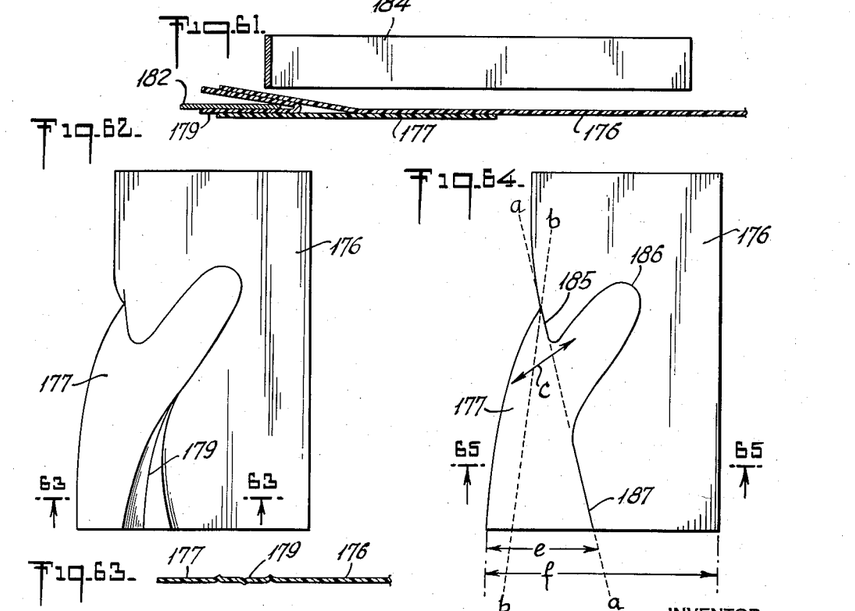
Figure 61 is a sectional view taken in the direction of the arrows 61—61 of Figure 60 and showing a die electrode in position to make the seal.
Figure 62 is a plan view of the palm side assembly shown in Figure 60 after being sealed and after being spread to form a palm sheet.
Figure 63 is a sectional view taken in the direction of the arrows 63—63 of Figure 62.
Figure 64 is a plan view of a modified palm side assembly corresponding to Figure 62 but in which the fourchette has been omitted.

Figures 60 and 61 illustrate the fabrication of the assembly 176—177. Figure 60 is a plan view of the assembly, the dotted line 181 indicating the inner edge of the sheet 177. A slip sheet 182 is interposed between the open edges of the fourchette 179. A seal is made with a frame electrode 184 along the edge 185, 186, 187. Figures 62 and 63 show the assembly 176—177 after it has been sealed and spread.

Figure 65:
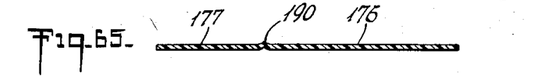
Figure 65 is a sectional view taken in the direction of the arrows 65—65 of Figure 64.

Figures 64 and 65 show a construction similar to Figures 62 and 63, excepting that in Figures 62 and 63 the thumb fourchette 179 has been omitted. In Figure 64 there is shown a dashed line a—a coacting with a dashed line b—b to define an angle c. It should be noted that the dashed line a—a extends generally along the line 185—187 of the sealed edge and the dashed line b—b extends over what will be the peripheral seal of the finished glove. The apex of the angle c is at the point where the final seal crosses over the seal 185, this point being indicated at 188 on Figure 66. It has been found that there is an optimum magnitude of the angle c of between 9 and 18 degrees, preferably about 12 degrees. Along the bottom edge of the sheets 176—177 are indicated distances e and f. It has been found that optimum fit prevails when the distance e is about 40%, plus or minus 15%, of the total width f. This proportioning is more important when no fourchette is used than with a fourchette.

Figures 66, 67, 68, 69, 70, 71, 72, 73:
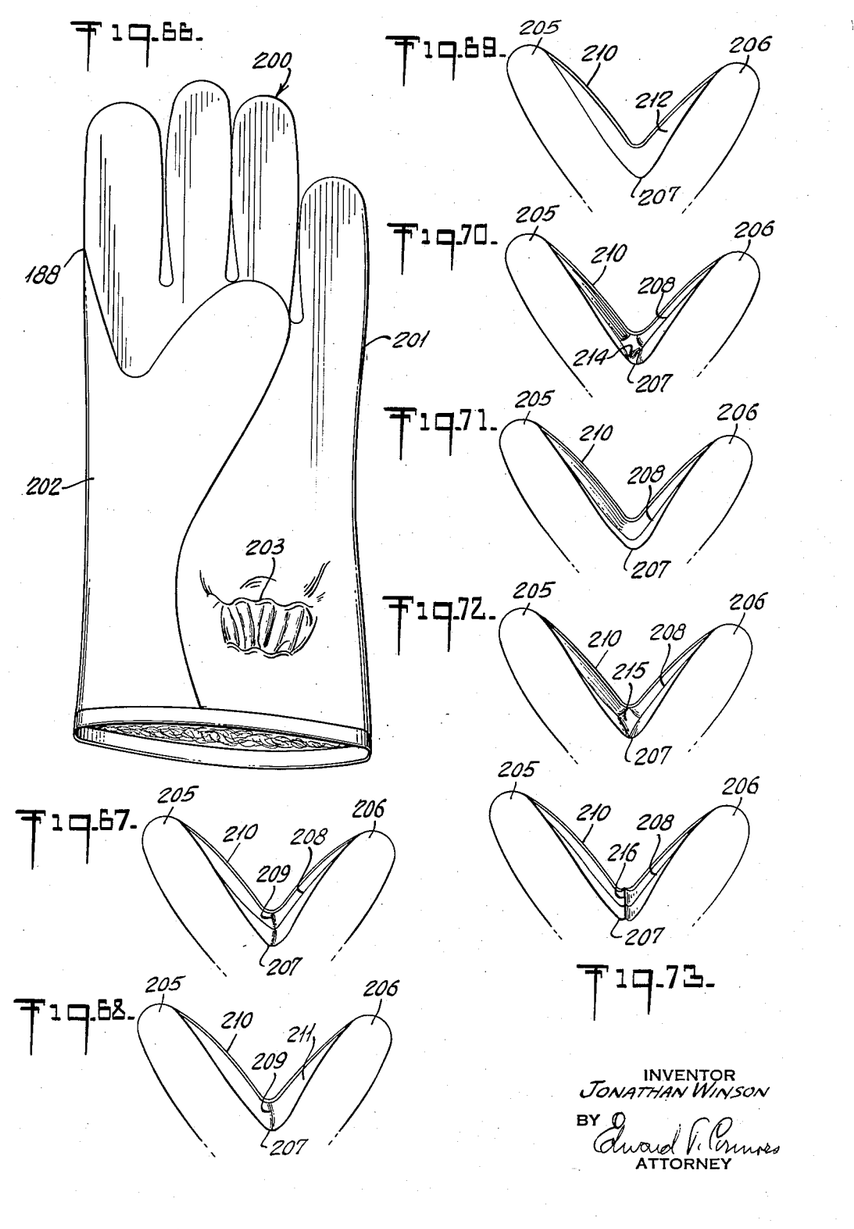
Figure 66 is a perspective view of a glove utilizing the palm side assembly of Figure 64 in which there is no fourchette for the thumb, the thumb side of the forefinger nor for the outer side of the little finger.
Figure 67 shows two fingers with the crotch therebetween and in which a fourchette presenting a creased appearance is used, the fourchette having a cross seal at the crotch extending from the palm side to the rear side, the seal being made from the inside surface of the fourchette.
Figure 68 is a view corresponding to Figure 67 but in which an uncreased fourchette is used.
Figure 69 shows two fingers with the crotch therebetween and in which a continuous uncreased fourchette is used.
Figure 70 shows two fingers with a crotch therebetween and in which a fourchette presenting a creased appearance is used, a well being present at the crotch, the well being substantially deeper than the width of the molded edge at the crotch.
Figure 71 shows two fingers with the crotch therebetween and in which a fourchette presenting a creased appearance is used, there being no cross seal at the crotch.
Figure 72 shows two fingers with the crotch therebetween and in which a fourchette presenting a creased appearance is used, the fourchette having been made from a tube such as shown in Figs. 53-58.
Figure 73 shows two fingers with a crotch therebetween and in which a fourchette presenting a creased appearance is used, the fourchette having a cross seal at the crotch extending from the palm side to the rear side, the seal having been made from the outer surface of the fourchette.

In Figure 66 there is shown a perspective view of a glove 200 incorporating the thumb assembly 176—177 of Figures 64 and 65 and without fourchettes on the edges 201 or 202. It has been found that this construction, in omitting certain of the fourchettes, results in a somewhat more economical construction. In order to enhance the fitting of the glove the palm surface may be provided with one or more elastic members 203 which may be of the type described in my previously mentioned Patent 2,884,643.

Inasmuch as several variations may be made in the construction of the fourchettes between adjacent fingers, it should be noted that the fourchette at the crotch may be fabricated in different manners. In Figure 67 there are shown two fingers 205 and 206 of a glove with an enclosed crotch 207. The fingers are made with a fourchette 208 presenting a creased appearance. The molded edge formed by the peripheral heat seal is indicated at 210. At the crotch 207 is made a cross seal 209, the seal being made from the inside of the glove and, if desired, made by partially reversing the glove so as to provide access to the fourchette at this location.

In Figure 68 the fabrication is similar to that shown in Figure 67 excepting that an increased fourchette 211 is used instead of the creased fourchette 210 of Figure 67.

In Figure 69 there are shown two fingers 205 and 206 with the crotch 207 included therebetween. In this construction fourchette 212 is made without a cross seam at the crotch 207 such as if made utilizing one of the frame methods of fabrication.

In Figure 70 there are shown two fingers 205 and 206 with a crotch 207 therebetween and the fourchette 208 presenting a creased appearance, a well 214 substantially deeper than the width of the molded edge 210 at the crotch being formed there such as may result from one of the constructions in which the end of the tube has been closed prior to the fabrication of the glove. Of course, this construction might also result from closing the crotch of the construction shown in Figure 67 when the fourchette is closed substantially below the crotch.

In Figure 71 there are shown two fingers 205 and 206 with a crotch 207 therebetween and in which the fourchette 208 presents a creased appearance along its length, there being no cross seal at the crotch 207. This construction might be made using one of the frame methods herein described and in which a strip fourchette is made with a longitudinally extending seal along its length. In Figure 72 there are shown two fingers 205 and 206 with a crotch 207 therebetween and in which the fourchette 208 is of the type presenting a creased appearance, the fourchette made from a tube 160 such as shown in Figures 53–58, crotch 215 showing the end fourchette of the tube. In Figure 73 there are shown two fingers 205 and 206 with the crotch 207 therebetween and the fourchette 208 presenting a creased appearance, the crotch 207 having a cross seal 216 extending from the palm side to the rear side of the glove, the seal 216 having been made from the outer surface of the fourchette.

Although the term "glove" has been used throughout the specification, it is to be understood that such language includes a hand covering with one or more fingers.

While the invention has been described and illustrated with reference to specific embodiments thereof, it will be understood that the other embodiments may be resorted to without departing from the invention. Therefore, the form of the invention set out above should be considered as illustrative and not as limiting the scope of the following claims.

I claim:

1. The method of making an electronically heat-sealed glove of thermoplastic material which comprises providing palm and rear sides, providing a fourchette with palm adjacent and rear adjacent surfaces which after heat sealing form outwardly turned edges, interposing the fourchette between the palm and rear sides, interposing heat seal prevention material between the palm and rear adjacent surfaces of the fourchette, maintaining the heat seal prevention materially wholly outside of what is to be the body of the finished glove, providing a die electrode having a shape corresponding to the desired periphery of the finished glove, maintaining the die electrode wholly outside of what is to be the body of the finished glove, and using the die electrode to simultaneously shape and weld the peripheral edge of the glove while using the heat seal prevention material to block the heat sealing of the fourchette edges to each other along at least a portion of their surfaces, whereby the fourchette provides fullness between the palm and rear sides of the glove.

2. A product made according to the method of claim 1.

3. A method according to claim 1, in which the palm and rear sides are cut along the heat seals which define the fingers of the glove after the heat seals have been made.

4. A method according to claim 1, in which the die electrode is used to make a tear seal which is thereafter separated to define the fingers of the glove.

5. A method according to claim 1, in which the edges of the fourchette are maintained in close proximity by the use of sheetlike heat seal prevention material while being sealed to the palm and rear sides by the die electrode.

6. A method according to claim 1, in which the edges of the fourchette are maintained in close proximity by the use of sheetlike heat seal prevention material while being sealed to the palm and rear sides by the die electrode and a sheet of material is folded to provide the fourchette.

7. A method according to claim 1, in which the edges of the fourchette are maintained in close proximity by the use of sheetlike heat seal prevention material while being sealed to the palm and rear sides by the die electrode and two sheets of material are heat sealed together longitudinally forming an assembly which is provided for the fourchette.

8. The method of making an electronically heat-sealed glove which comprises providing a tube, interposing the tube between a palm side and a rear side, interposing sheetline heat seal prevention material between the walls of the tube for at least a portion of its length, using a die electrode to heat seal at least a portion of the palm side to the adjacent wall of the tube and to heat seal at least a portion of the rear side to the adjacent wall of the tube, the sheetlike heat seal prevention means blocking heat sealing of the walls of the tube together, whereby fullness is provided between the palm and rear sides of the glove.

9. A method according to claim 8, in which the end of the tube is sealed before being interposed between the palm and rear sides.

10. A method according to claim 8, in which the tube is sealed between the palm and rear sides and the end of the tube is thereafter sealed.

11. The method of making an electronically heat-sealed glove comprising providing sheets of material for a palm side and for a rear side, providing a pair of sheets of material for a fourchette, interposing a sheet of heat seal prevention material between at least a portion of the fourchette sheets, using a die electrode to heat seal the fourchette sheets together to form a fourchette assembly, interposing the fourchette assembly between the palm and rear sheets to form a stacked assembly, maintaining the heat seal prevention material wholly outside of what is to be the finished glove, and thereafter using a die electrode to simultaneously shape and weld the peripheral edge of the glove.

12. A method according to claim 1, in which a frame electrode is used as the heat seal prevention material and as the die electrode.

13. The method according to claim 1 in which there is provided a heat seal preventing frame electrode, providing a strip of material for a fourchette, placing the strip on the inner side of the frame with the edges of the strip turned outwardly, maintaining the strip in position on the frame, interposing the frame with the strip in position between the palm and rear sheets to form a stacked assembly, and thereafter using a pair of flat electrodes to heat-seal the stacked assembly.

14. The method of making an electronically heat sealed glove having at least a pair of adjacent fingers with a crotch therebetween comprising providing sheets of material for a palm side and for a rear side, providing a heat seal preventing frame electrode shaped so as to provide a plurality of generally linear extensions therefor defining the side walls and the crotch between adjacent fingers, providing a tube for each frame linear extension, placing each tube in position over its linear extension, interposing the frame with its tubes in position between the palm and rear sides to form a stacked assembly, and thereafter using a pair of flat electrodes to heat-seal the stacked assembly.

15. A method according to claim 14, in which the frame electrode is used to provide a tear seal which is thereafter ripped to separate the fingers of the glove.

16. A method according to claim 14, in which adjacent sides of the tubes are provided with connecting flat strips, and in which the flat strips are placed against the inside of the frame between the linear extensions and turned outwardly over the palm and rear edges of the frame before the frame is placed in the stacked assembly, the flat strips providing fourchettes at the fingertips.

17. A method according to claim 14, in which the electronically heat-sealed glove is removed from its frame and thereafter the ends of the fingertips are heat-sealed by a die electrode.

18. An electronically heat sealed glove made from thermoplastic sheeting, the finished glove including palm and rear sides and having at least two adjacent fingers with a crotch portion therebetween, and a fourchette of thermoplastic material providing fullness for a continuous section including at least a portion of the lengths of each of the adjacent finger edges and the included crotch portion, the palm adjacent edge of the fourchette secured to the edge of the finger portion of the palm side and the rear adjacent edge of the fourchette secured to the edge of the finger portion of the rear side by welds of the type effected by an electronic die electrode, the fourchette having its edges turned outwardly and joining the palm and rear sides of the glove along at least a portion of the length of two adjacent fingers and the included crotch portion in smooth outwardly directed one-sided welded lap joints, the one-sided welded lap joints forming at least the principal means of connection of the fourchette to the palm and back sides, the respective one-sided welded lap joints of the fourchette to the palm and rear sides being positioned on the outermost edges of the fingers of the glove and defining the peripheral shape thereof.

19. A glove made in accordance with claim 18 in which the fourchette is a pair of thermoplastic sheets secured together in a one-sided lap joint by a weld of the type effected by an electronic die electrode extending lengthwise of the fingers.

20. A glove according to claim 18 in which the fourchette is a pair of thermoplastic sheets secured together in a one-sided lap joint by a weld of the type effected by an electronic die electrode, and the apex of the joint is directed inwardly so that the fourchette presents a creased appearance.

21. A glove made in accordance with claim 18 in which the fourchette is a tube which has been split.

22. A glove made in acocrdance with claim 18 in which the fourchette is a continuous strip.

23. An electronically heat sealed glove made from thermoplastic sheeting, the finished glove including palm and rear sides, a thumb having palm facing and rear facing portions of the same dimensions, the thumb palm facing and the thumb rear facing portion and the palm and rear sides of the glove made from flat thermoplastic sheeting, a weld of the type effected by an electronic die electrode extending from the wrist edge of the glove up the outer edge of the thumb around the tip of the thumb down the inner edge of the thumb around the uppermost edge of the crotch of the thumb and in a substantially straight line toward the finger tips, a second weld of the type effected by an electronic die electrode joining the palm and rear sides of the glove on the thumb edge of the glove, the first weld intersecting the second weld at an angle of less than sixty degrees, said first weld at the crotch portion defining the uppermost extending part of the glove at said crotch portion.

24. A glove according to claim 23 in which a fourchette provides fullness for the outer edge of the thumb.

References Cited in the file of this patent

UNITED STATES PATENTS

| | | |
|---|---|---|
| 2,433,327 | Anderson | Dec. 30, 1947 |
| 2,440,664 | Irons | Apr. 27, 1948 |
| 2,732,559 | Sabin | Jan. 31, 1956 |
| 2,770,809 | Howard | Nov. 20, 1956 |
| 2,809,376 | Winson | Oct. 15, 1957 |